US006254781B1

(12) United States Patent
Raj

(10) Patent No.: US 6,254,781 B1
(45) Date of Patent: Jul. 3, 2001

(54) METHOD FOR RECYCLING FERROFLUID CONSTITUENTS USED IN A MATERIALS SEPARATION PROCESS

(75) Inventor: Kuldip Raj, Merrimack, NH (US)

(73) Assignee: Ferrofluidics Corporation, Nashua, NH (US)

(*) Notice: Subject to any disclaimer, the term of this patent is extended or adjusted under 35 U.S.C. 154(b) by 0 days.

(21) Appl. No.: 09/565,011

(22) Filed: May 4, 2000

Related U.S. Application Data

(62) Division of application No. 09/177,066, filed on Oct. 22, 1998, now Pat. No. 6,103,107.

(51) Int. Cl.[7] .......................... B01D 35/08; C01G 49/08

(52) U.S. Cl. ........................ 210/695; 210/739; 210/749; 210/765; 210/767; 210/772; 210/774; 210/781; 210/787; 210/805; 134/12; 134/22.14; 203/39; 203/44; 252/62.51

(58) Field of Search ........................ 210/97, 121, 177, 210/178, 198.1, 219, 223, 295, 360.1, 304, 380.1, 695, 739, 740, 749, 765, 760, 767, 772, 774, 789, 787, 805; 134/12, 22.14; 203/39, 44; 252/62.51

(56) References Cited

U.S. PATENT DOCUMENTS 3,483,969 12/1969 Rosensweig .
4,435,302 3/1984 Reimers et al. .
5,240,628 * 8/1993 Kanno et al. .................... 252/62.51

FOREIGN PATENT DOCUMENTS 52-3093 * 3/1977 (JP) .
61-112306 5/1986 (JP) .
01107502 4/1989 (JP) .
WO9503128 2/1995 (WO) .

OTHER PUBLICATIONS

Khalafala, S.E. and Reimers, G.W., "Magneto–Gravimetric Separation of Nonmagnetic Solids", Socity of Mining Engineers, AIME 198 Transactions, v. 254, Jun. 1973, pp. 193–197.

Fujita, T, "Separation of Nonmagnetic Particles with Magnetic Fluid," reprinted in Magnetic Fluids and Applications Handbook, edited by B. Berkovski, Begell House, Inc. New York, (1996), Chapter 6.1 pp 755–787.

Farkas et al., "Recovery and Reconstitution of Ferromagnetic Fluids", Separation Science and Technology, pp. 917–939, 1983.*

* cited by examiner

*Primary Examiner*—David A. Reifsnyder
(74) *Attorney, Agent, or Firm*—Kudirka & Jobse, LLP

(57) ABSTRACT

Ferrofluid coated particles resulting from a ferrofluid materials separation process are washed with a solvent which is the same material as the liquid carrier employed in the ferrofluid. The result is a "dirty" solvent which is a very weak ferrofluid. The dirty solvent is then filtered or centrifuged to remove dust particles and other impurities and then the solvent is recovered by distillation in a distillation unit. The solvent can then be reused in the materials reclamation process. The residue in the distillation unit is surfactant-coated particles of ferrofluid. This residue is mixed with either clean or unprocessed solvent in the right proportion and the slurry is passed through an attritor to convert it to a high grade ferrofluid. The ferrofluid can also be reused in the materials separation process.

9 Claims, 3 Drawing Sheets

METHOD FOR RECYCLING FERROFLUID CONSTITUENTS USED IN A MATERIALS SEPARATION PROCESS

RELATED APPLICATIONS

This application is a division of U.S. patent application Ser. No. 09/177,066, filed Oct. 22, 1998, by Kuldip Raj and entitled METHOD AND APPARATUS FOR RECYCLING FERROFLUID CONSTITUENTS USED IN A MATERIALS SEPARATION PROCESS. Now U.S. Pat. No. 6,103,107.

FIELD OF THE INVENTION

This invention relates to the separation and reclamation of contaminated ferrofluid constituents, and specifically ferrofluid constituents which have been used in a materials separation process.

BACKGROUND OF THE INVENTION

Ferrofluids are magnetically responsive materials and consist of three components: magnetic particles, a surfactant and a liquid carrier. The particles, typically $Fe_3O_4$, are of submicron size, generally about 100 Å in diameter. The magnetic particles are coated with a surfactant to prevent particle agglomeration under the attractive Van der Waals and magnetic forces and are dispersed in the liquid carrier. Ferrofluids are true colloids in which the particles are permanently suspended in the liquid carrier and are not separated under gravitational, magnetic and/or acceleration forces. The liquid carrier can be an aqueous, an oil or an organic solvent.

Ferrofluids can be utilized in the separation of mixed nonferrous materials or minerals such as those found in auto scrap, machine shop waste and glacier deposits. The separation process is based on the density of the materials and depends on the fact that the ferrofluid generates a magnetic "levitation" force when placed in an inhomogeneous magnetic field. An upward-directed levitation force floats normally sinking particles by counterbalancing their density mismatch with the ferrofluid.

Two different techniques are commonly used to perform the separation process. The first conventional technique is called the magnetostatic or the sink/float process. In this process material to be separated is passed through a static column of ferrofluid situated in a gradient magnetic field. Material of higher density sinks to the bottom and material of lower density floats to the top. When the magnetic field gradient is appropriately adjusted, two fractions are generated which are collected in separate bins.

The second conventional technique is called the magnetodynamic process. In this process a vertical column of ferrofluid is also located in a magnetic field gradient but the fluid is rotating rather than being static. The magnetic field gradient is aligned so that the magnetic levitation force is toward the axis of rotation of the ferrofluid column. A stream of particles to be separated is introduced at the top of the ferrofluid column. As the particles fall under the influence of gravity they are subjected to opposing centrifugal and ferrofluid levitation forces causing the particle stream to split up into two fractions, one of higher density and one of lower density. At the bottom of the column the higher density component is collected farther form the axis of rotation and the lower density component is collected near the rotation axis. Both the sink/float technique and the magnetodynamic technique are described in detail in an article entitled "Separation of Nonmagnetic Particles With Magnetic Fluid", T. Fujita printed in the book *Magnetic Fluids and Applications Handbook*; ed. B. Berkovski; Begell House, Inc., New York (1996), which article is incorporated in its entirety by reference herein. The sink/float technique is also disclosed in U.S. Pat. No. 3,483,969 which is also incorporated by reference.

Ferrofluids used in material separation processes use a relatively low viscosity carrier liquid such as water, kerosene or a low molecular weight refined hydrocarbon solvent such as Isopar solvent produced by Exxon Corporation, Houston, Tex. The low viscosity of the carrier liquid is necessary for efficient separation. The saturation magnetization of ferrofluid depends on the process and the density of materials to be separated and may range from 10 to 600 Gauss.

In both of the conventional separation techniques the separated material is often coated with ferrofluid and must be washed with a solvent to complete the final step in the process. The waste liquid which results from the washing step may be viewed as a ferrofluid diluted with solvent and contaminated with dust particles and other impurities. Moreover, this dilute ferrofluid is well below the concentration which can be used in the separation process and is, therefore, essentially lost.

Since up to 10 per cent of the ferrofluid used in the separation process may be lost in the washing step, ferrofluids currently are not widely used in nonferrous material separation applications due to high cost of the fluids. However, if both the solvent and the ferrofluid could be reclaimed, the cost of separation process could be considerably reduced.

U.S. Pat. No. 4,435,302 discloses a chemical method for reclaiming and concentration of water-based magnetic fluids. In this patent the separated materials which are coated with ferrofluid are washed in water. The magnetic particles in the dilute washing liquid are chemically flocculated by addition of hydrochloric acid. The flocculant is removed from the liquid by filtration and then redispersed in water to a desired concentration. A problem with this process is that dust and other impurities present in the washing liquid are also separated with the flocculant and remain in the reconstituted ferrofluid, thereby contaminating it. Furthermore, an additional chemical is required for the flocculation step thereby adding to the cost of the process.

Japanese Patent Application No. 52-30973 shows a process for reclamation of an organic liquid based ferrofluid. The coated particles resulting from the separation process are washed with 1,1,1 trichloroethane cleaning solvent which is different from the organic carrier in which the ferrofluid particles are suspended. Both the solvent and ferrofluid can be recovered from the resulting wash liquid by distillation which removes dust and other contaminants. This system is effective but has drawbacks: Vapors from the 1,1,1 trichloroethane cleaning solvent pose a serious health hazard. In addition, even after distillation, traces of the cleaning solvent may be present in the reclaimed ferrofluid and thus may affect its properties. Finally, with such a process, the magnetization of the reclaimed ferrofluid cannot be increased beyond its original value to achieve separation of a wide range of materials.

Accordingly, there is a need for a better ferrofluid reclamation process.

SUMMARY OF THE INVENTION

In one illustrative embodiment, the ferrofluid-coated nonferrous particles resulting from the separation are washed with a solvent which is the same material as the liquid carrier employed in the synthesis of the ferrofluid, i.e. water for an aqueous-based ferrofluid and kerosene for a kerosene-based ferrofluid, etc. The result is that the "dirty" solvent essentially becomes a very weak ferrofluid. The dirty solvent is then filtered to remove dust particles and other impurities and then the solvent is recovered by distillation in a distillation unit.

The residue in the distillation unit is surfactant-coated particles of ferrofluid. This residue is mixed with either clean or unprocessed solvent in the right proportion and the slurry is passed through an attritor to convert it to a high grade ferrofluid. In accordance with one embodiment, prior to passing the slurry into the attritor, an appropriate amount of surfactant is added to ensure a good colloid stability.

BRIEF DESCRIPTION OF THE DRAWINGS

The above and further advantages of the invention may be better understood by referring to the following description in conjunction with the accompanying drawings and which.

DETAILED DESCRIPTION

Figure 1:
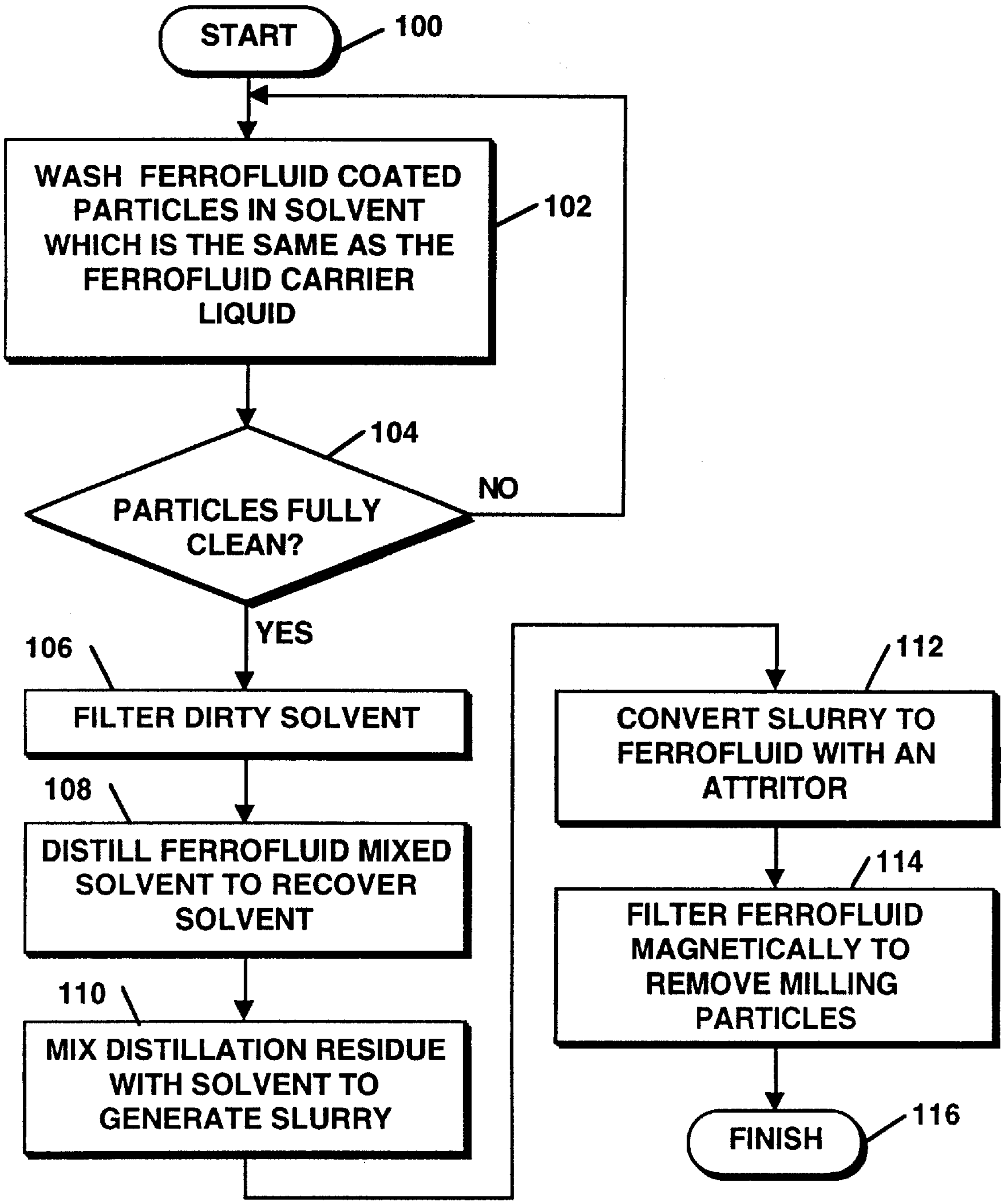
FIG. 1 is a flowchart which illustrates the steps in the illustrative ferrofluid reclamation process.

FIG. 1 illustrates the steps in the inventive ferrofluid reclamation method. The process begins in step 100 and proceeds to step 102 where the separated materials coated with ferrofluid from the separation process are washed in a solvent which is the same as the carrier fluid of the ferrofluid. For example, a water solvent is used for an aqueous-based ferrofluid and a kerosene solvent is used for a kerosene-based ferrofluid. The washing may be performed by spraying the coated materials or by using an ultrasonic bath.

In step 104, a determination is made whether the ferrofluid-coated processed particles are clean. If not, step 102 is repeated until the coated materials are clean. The process then proceeds to step 106.

In step 106 the "dirty" solvent, which is essentially a very weak ferrofluid containing a small number of ferrofluid particles, is filtered to remove dust and other impurities. A centrifuge may also be used to remove particles. In step 108, the filtered dirty solvent is distilled to recover clean solvent. The clean solvent can then be reused in the materials separation process. The residue which remains in the bottom of the distillation apparatus consists of ferrofluid particles covered with surfactant.

In step 110 the distillation residue is mixed with a sufficient quantity of solvent to produce a ferrofluid with a desired magnetization. Either clean solvent can be used or the filtered solvent that results from the materials washing process can be used. The result is a slurry of ferrofluid particles and carrier liquid. Additional surfactant may also be added at this time.

Next, in step 112, the slurry is converted to a ferrofluid by passing it through an attritor. Finally, in step 114, the resulting ferrofluid is magnetically filtered to remove any foreign particles produced by the attrition process. The resulting ferrofluid can then be reused in the materials separation process. The process then ends in step 116.

Figure 2:
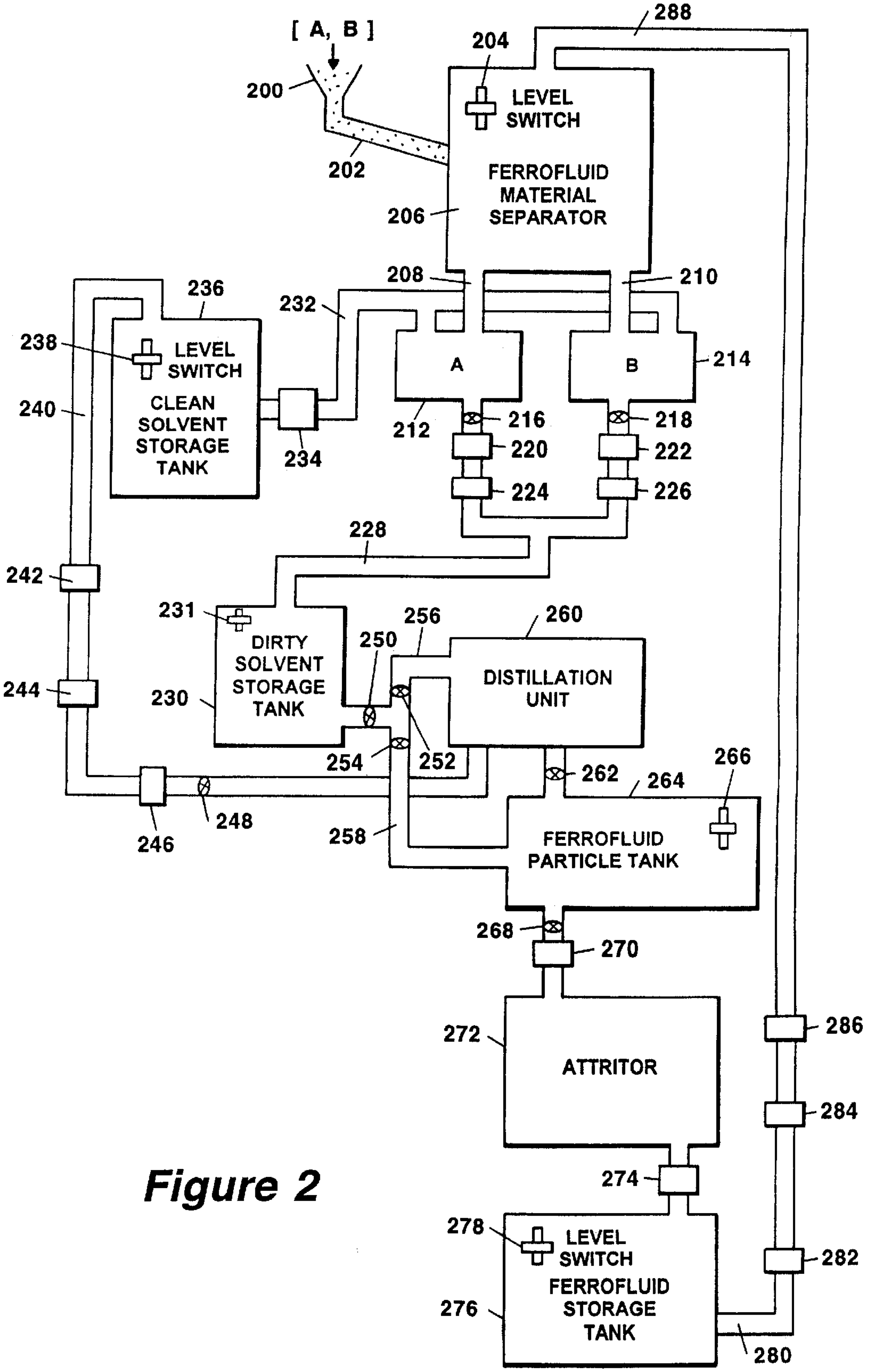
FIG. 2 is process piping diagram which illustrates an embodiment in which both the materials separation process and the ferrofluid reclamation process are continuous.

Various components of an illustrative continuous ferrofluid reclamation scheme are shown in the process piping diagram shown in FIG. 2. Mixed material substances [A,B] to be separated in hopper 200 enter ferrofluid material separator 206 continuously via moving belt 202. The ferrofluid level in the separator is maintained by level limit switch 204. The [A,B] materials pass through ferrofluid separator 206 and divide into two fractions [A] and [B] which pass through pipes, or are carried by conveyor belts 208 and 210, into ultrasonic baths 212 and 214, respectively. The fractions [A] and [B] are coated with ferrofluid and are washed in ultrasonic baths 212 and 214. In particular clean solvent is pumped from tank 236 by pump 234 and pipe 232 to baths 212 and 214. The solvent used in the baths 212 and 214 is the same as the liquid carrier employed in the synthesis of the ferrofluid used in separator 206, i.e. water for an aqueous based ferrofluid and kerosene for a kerosene based magnetic fluid. The ferrofluid-coated particles may require more than one rinse before they are fully clean. The cleaning solvent turns from white to light tea color when mixed with the ferrofluid from the coated particles. The resulting "dirty" or contaminated solvent is a very weak ferrofluid of no practical value.

The "dirty" solvent from baths 212 and 214 passes through valves 216 and 218 and is pumped by pumps 220 and 222 through filters 224 and 226, respectively. Filters 224 and 226 remove dust particles and other impurities. The filtered "dirty" solvent then travels through pipe 228 to dirty solvent storage tank 230. The liquid level in tank 230 is controlled by level limit switch 231.

From storage tank 230, the dirty solvent passes through valves 250 and 252, via pipe 256 into a distillation unit 260. Unit 260 may be a conventional commercial distillation unit where the solvent is boiled off and condensed. The clean clear solvent obtained from the distillation unit passes through valve 248 and is pumped by pump 246 through density meter 244 and flow meter 242 via pipe 240 into a storage tank 236 for later use in the ultrasonic baths 212 and 214. The level in clean solvent storage tank 236 is controlled be level limit switch 238.

After the distillation process, an unevaporated residue in the distillation unit 260 is the surfactant coated particles of ferrofluid. This residue passes through valve 262 to the ferrofluid particle tank 264 whose level is controlled by level limit switch 266. In tank 264 the ferrofluid residue is mixed with a carrier material which can be either clean solvent from tank 236 (via piping not shown) or unprocessed solvent from tank 230 by opening valves 250 and 254 and closing valve 252 to cause the solvent to flow through pipe 258 to ferrofluid tank 264. The carrier liquid is added to recovered particles in tank 260 in the right proportion to produce a ferrofluid of the desired density and the resulting slurry is pumped via valve 268 and pump 270 to an attritor 272 to convert the slurry to a high grade ferrofluid. If necessary, prior to passing the slurry into the attritor 272, an appropriate amount of surfactant may be added to ensure a good colloid stability. Attritor 272 is a conventional commercial attrition mill such as a model DM-20 attrition mill, manufactured by the Union Process Company, Akron, Ohio.

From the attritor 272 the ferrofluid flows through a magnetic filter 274 to remove any milling particles generated by the attrition process and is then stored in tank 276 for use in the separation apparatus 206. The level in tank 276 is controlled by level limit switch 278. When needed in separation apparatus 206, ferrofluid in tank 276 is pumped by pump 282 to separation apparatus 206 via pipe 288. A density meter 284 and a flowmeter 286 can be used to monitor ferrofluid density and flow rates, respectively.

The reclaimed solvent and ferrofluid may also be used in a continuous loop with appropriate flow rates without using the intervening storage tanks. FIG. 2 shows pumps 220, 222, 234, 246, 270 and 282; solenoid valves 216, 218, 248, 250, 252, 254 and 268, flow meters 242 and 286 and level indicators 204, 238, 266 and 278 at various locations which are the standard engineering practices for handling, measuring and controlling fluids. The movement of materials from one location to another may also be achieved with conveyor belts or carousels.

Figure 3:
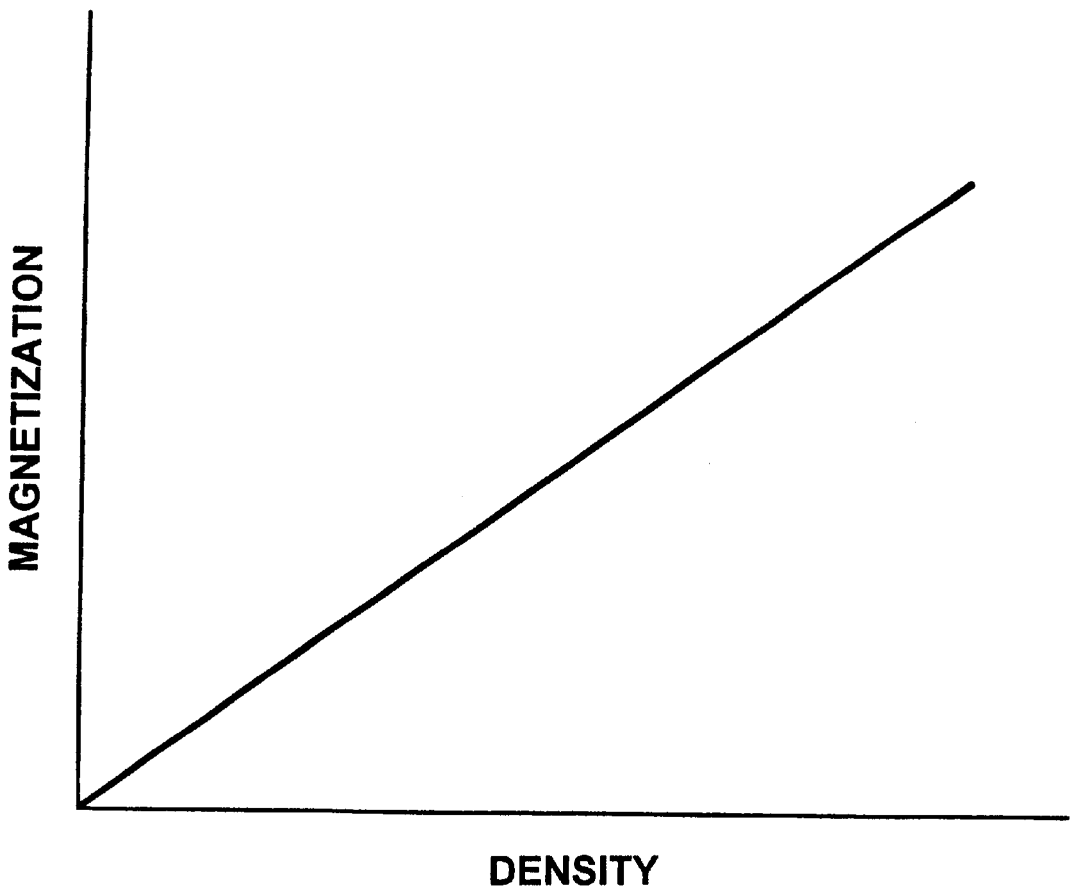
FIG. 3 is a chart illustrating the relationship between magnetization and density of a ferrofluid.

The magnetization of ferrofluid after it has been reclaimed can be determined by measuring the density of the ferrofluid. FIG. 3 shows a graph representing density on the horizontal scale and ferrofluid magnetization in the vertical scale. The graph illustrates a linear relationship between the density and magnetization values. Thus, in the present scheme, the magnetization of ferrofluid can be adjusted to suit the processing requirements by appropriately measuring and adjusting the ferrofluid density.

Because the cleaning solvent is the same as the carrier of the ferrofluid any contamination of ferrofluid with solvent is eliminated. In addition, the carrier or solvent poses a minimum health hazard and is environmentally safe. Since the ferrofluid particles are reclaimed by distillation, the magnetization of ferrofluid can be adjusted and, if need be, can be increased beyond the original value with the attritor. This permits the use of a tuneable material separator. The process can be run continuously because the ferrofluid is freshly synthesized in the process and the quality of the fluid is maintained. Therefore, the ferrofluid can be reclaimed practically in an endless cycle.

Although only few illustrative embodiments have been disclosed, other embodiments will be apparent to those skilled in the art. For example, although particular piping arrangements have been disclosed, it is obvious that other process arrangements will also be satisfactory. These modifications and others which will be apparent to those skilled in the art are intended to be covered by the following claims.

What is claimed is:

1. A method for reclaiming ferrofluid having ferrofluid particles suspended in a carrier liquid, from ferrofluid coated materials produced by a ferrofluid materials separation process, the method comprising the steps of:

(a) washing the ferrofluid coated materials in a solvent which is the same as the carrier liquid until the coated materials are clean and the solvent becomes dirty;

(b) distilling the dirty solvent to recover clean solvent and producing a distillation residue;

(c) mixing additional solvent with the distillation residue to form a slurry; and (d) converting the slurry to a ferrofluid with an attritor.

2. A method according to claim 1 wherein step (a) comprises the step of:

(a1) washing the ferrofluid coated materials in an ultrasonic bath.

3. A method according to claim 1 further comprising the step of:

(e) filtering the dirty solvent to remove impurities.

4. A method according to claim 1 further comprising the step of:

(f) centrifuging the dirty solvent to remove impurities.

5. A method according to claim 1 wherein step (c) comprises the step of:

(c1) adding surfactant to the slurry.

6. A method according to claim 1 further comprising the step of:

(g) filtering the ferrofluid converted by the attritor with a magnetic filter.

7. A method according to claim 1 further comprising the step of:

(h) monitoring the density of the ferrofluid converted by the attritor.

8. A method according to claim 1 further comprising the step of:

(i) returning the ferrofluid converted by the attritor to the ferrofluid materials separation process for reuse.

9. A method according to claim 8 wherein step (i) comprises the step of:

(i1) measuring the flow of ferrofluid in the returning means.

* * * * *